(12) United States Patent
Gurin et al.

(10) Patent No.: US 8,459,037 B2
(45) Date of Patent: Jun. 11, 2013

(54) METHOD AND SYSTEM FOR FEEDING A GAS-TURBINE ENGINE WITH LIQUID FUEL

(75) Inventors: Victor Gurin, Hallandale, FL (US); Serguei Permiakov, Kanata (CA); Igor Gachik, Boca Raton, FL (US); Yulia Gurina, Santo Domingo (DO)

(73) Assignee: Fuecotech, Inc., Hollywood, FL (US)

( * ) Notice: Subject to any disclaimer, the term of this patent is extended or adjusted under 35 U.S.C. 154(b) by 1034 days.

(21) Appl. No.: 12/455,417

(22) Filed: Jun. 2, 2009

(65) Prior Publication Data
US 2010/0037586 A1 Feb. 18, 2010

Related U.S. Application Data

(60) Provisional application No. 61/130,813, filed on Jun. 4, 2008.

(51) Int. Cl.
*F02C 1/00* (2006.01)

(52) U.S. Cl.
USPC .............................. 60/772; 60/39.52; 60/775

(58) Field of Classification Search
USPC ..................... 60/39.281, 734, 39.52, 772, 775
See application file for complete search history.

(56) References Cited

U.S. PATENT DOCUMENTS

| | | | | |
|---|---|---|---|---|
| 4,110,973 A | * | 9/1978 | Haeflich et al. | 60/775 |
| 4,214,435 A | * | 7/1980 | Campbell | 60/775 |
| 5,617,716 A | * | 4/1997 | Schreiber et al. | 60/775 |
| 5,974,780 A | * | 11/1999 | Santos | 60/775 |
| 6,273,072 B1 | | 8/2001 | Knapstein | |
| 7,011,048 B2 | | 3/2006 | Gurin | |
| 7,406,955 B1 | | 8/2008 | Gachik | |
| 7,523,747 B2 | | 4/2009 | Gachik | |
| 2006/0016198 A1 | * | 1/2006 | Stuttaford et al. | 60/776 |

* cited by examiner

*Primary Examiner* — Phutthiwat Wongwian
(74) *Attorney, Agent, or Firm* — Hershkovitz & Associates, PLLC; Abraham Hershkovitz

(57) ABSTRACT

A method is provided for supplying a liquid fuel to a gas-turbine engine, e.g. aviation engine. It includes selective fuel delivery through several fuel delivery lines for different engine operating modes based on a required engine power, providing, e.g. feeding the engine operating at minimal power with base or traditional for this type of engine fuel through a base fuel delivery line; in other operating modes the fuel is fed to the engine either through conditioned fuel delivery line with preliminary conditioning of base fuel or through both said fuel delivery lines simultaneously with mixing both fuel flows directly before entering an engine combustion chamber, e.g., in a line connecting intake manifold for the base fuel and each individual fuel injector.

5 Claims, 1 Drawing Sheet

SCHEMATIC VIEW OF THE SYSTEM FOR FEEDING GAS-TURBINE ENGINE WITH LIQUID FUEL

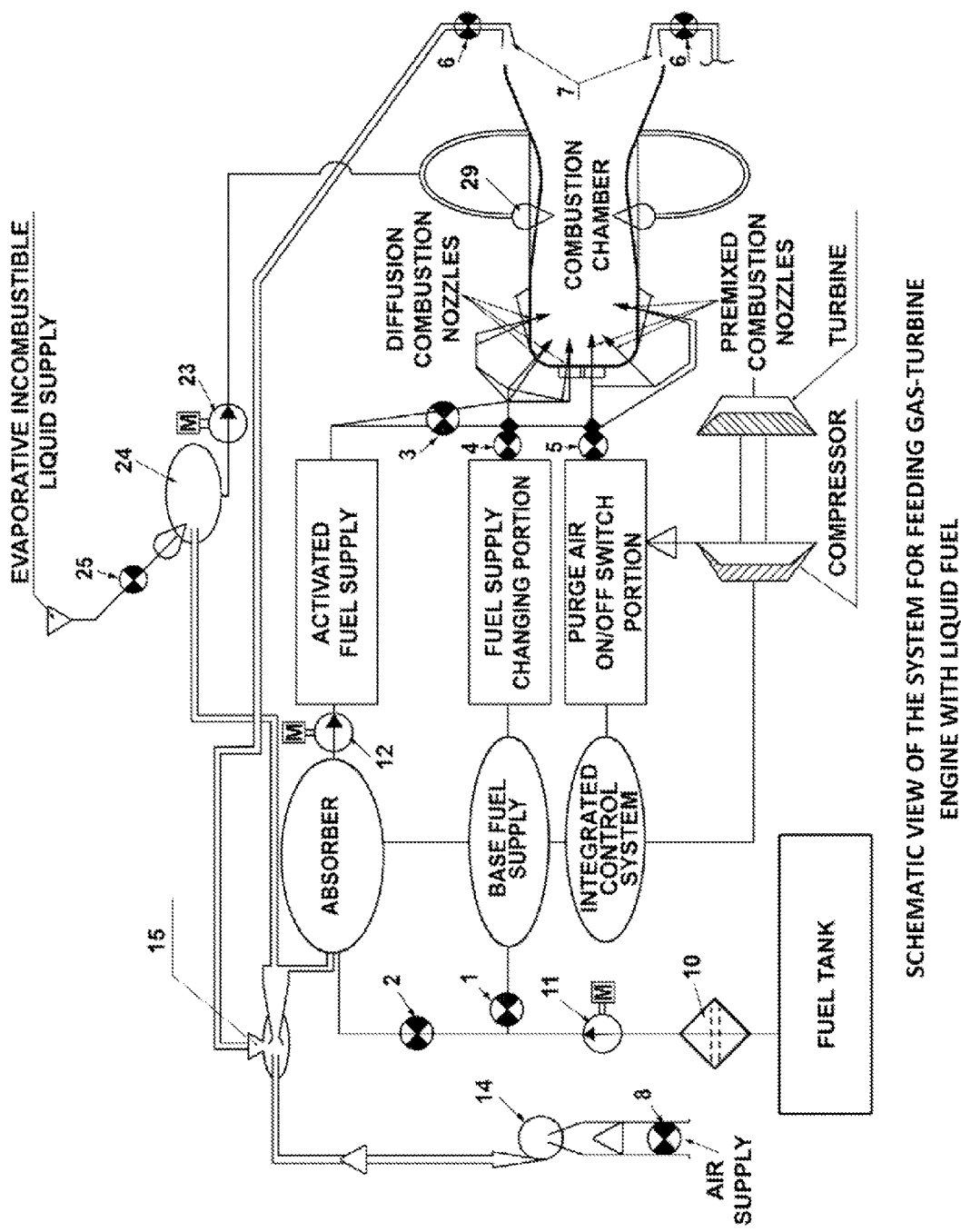

METHOD AND SYSTEM FOR FEEDING A GAS-TURBINE ENGINE WITH LIQUID FUEL

CROSS-REFERENCE TO RELATED APPLICATION

The invention described herein is directly related to earlier filed Provisional U.S. Application No. 61/130,813, entitled, Method And System For Feeding A Gas-Turbine Engine With Liquid Fuel, filed 4 Jun. 2008, Confirmation No. 4105.

FIELD OF INVENTION

A gas-turbine engine is used to present new solutions of this patent as most illustrative example. Similar method and fuel supplying systems can be easily used with any type of engines operating on different liquid fuels.

BACKGROUND OF THE INVENTION

The efficiency of the fuel combustion determines the main operational characteristics of the engine: overall efficiency, noise, emissions, etc. Typical fuel supply systems and systems for injecting and dispersing fuel in the combustion chamber have their own limitations.

Usually to improve gas turbine engine performance a two-stage combustion changing system is suggested. In such type of engine a diffuse combustion mode is used to start the engine or operate it at decreased loads. When gas turbine engine operate at normal loads or continuous working loads a premix fuel/air combustion mode is used that improve emission efficiency.

There are known approaches where to reduce fuel consumption an incombustible liquid, water, is added. At high temperature in the combustion chamber water evaporates and resulted superheated steam significantly increases the pressure in the combustion chamber. Thereby rises the enthalpy of the combustion process as well as overall engine efficiency. In practice such approaches were used with short-lived engines such as engines for military applications. Experiments with gas-turbine engines used for natural gas pumping showed fuel efficiency of up to 25%, but adverse effect on service life. The life of the gas-turbine engine operating at constant loads reduced significantly (in more than 10 times) due to corrosion of working parts as during vaporization there are some liquid water droplets that do not evaporate fast enough. Special treatments of the water to reduce its corrosion activity did not give acceptable results. In case of gas-turbine engines operating at variable loads such as engines for marine and aviation applications the problem of corrosion becomes more aggravated and does not allow using that approach.

In general the technology of utilizing the combustion heat by addition of evaporative liquid is under development by some companies. For example, BMW has announced about development of a special additional turbine to be installed downstream the main turbine and injection of water in the exhaust stream in the inlet of the additional turbine. Similar approaches are under development in some US companies in order to increase the engine efficiency and reduce fuel cost.

SUMMARY OF THE INVENTION

A new method of fuel preparation before injection provides increased working pressure in the combustion chamber while injecting less fuel through inject nozzles of the gas-turbine engine. The fuel supply system provides feeding fuel in exclusively liquid continuous phase whereas a gas or gases are previously dissolved in the fuel. Resulted gas in the fuel under-saturated solution containing sorbed gas/gases in bound form is generate power when engine operates at loads greater than idle load, e.g. at nominal loads or at most continuous working loads.

When injecting gas in fuel solution in the combustion chamber of the gas-turbine engine the conditions prevailing in the combustion chamber provides intensive gas expansion out of the solution thereby results in the finest fuel atomization. In suggested method there are two factors of achieving such results: sharp drop in the pressure at the injector end with hydrodynamic breakage of injected fuel spray and continuous chain physical breakage of the fuel microdroplets due to active gas desorption ("degassing") from the solution. Continuous degassing prevents microdroplets coalescence. So the conditioned (with dissolved gases) fuel burns close to detonation mode, i.e., with high flame propagation. At the same time the combustion process is stable and controllable.

In accordance with the invention to further increase the efficiency of the gas-turbine engine an incombustible evaporative liquid, e.g., demineralized and filtered water, treated with atomizing gasses under high pressure, is introduced in small amounts in the combustion of light petroleum fuel—kerosene, gasoline or diesel. When water with dissolved gasses, especially a mixture of $CO_2$ with air, is injected in the combustion chamber the dissolved gasses burst out of solution; as a result incombustible liquid quickly evaporate and transfer to a state of superheated steam increasing the pressure in the combustion chamber of the gas-turbine engine.

BRIEF DESCRIPTION OF DRAWING

FIG. 1 shows a schematic view of the system for feeding gas-turbine engine according to the present invention.

DETAILED DESCRIPTION OF THE INVENTION

A new method of fuel preparation before injection provides increased working pressure while injecting less fuel through combustion chamber nozzles of the gas-turbine engine. The fuel supply system provides feeding fuel in exclusively liquid continuous phase whereas a gas or gases are previously dissolved in the fuel. Resulted gas in the fuel under-saturated solution containing dissolved gas/gases in bound form is generate power when engine operates at loads greater than idling, e.g. at nominal loads or at most continuous loads.

When injecting gas in fuel solution in the combustion chamber of the gas-turbine engine the conditions prevailing in the combustion chamber provides intensive gas expansion out of the solution thereby results in the finest fuel atomization. In suggested method there are two factors of achieving such results: sharp drop of the pressure at the injector end with hydrodynamic breakage of injected fuel spray and continuous chain physical breakage of the fuel microdroplets due to active gas desorption ("degassing") from the solution. Continuous degassing prevents microdroplets coalescence. So the conditioned (with dissolved gases) fuel burns close to detonation mode, i.e., with high flame propagation. At the same time the combustion process is stable and controllable.

In suggested embodiments of the invention there are three modes of fuel combustion: a) diffusion combustion mode for idle or at low loads, e.g., at taxiing before take-off or after landing; b) base combustion mode with designed fuel/air mixture at increased loads, e.g., at taking-off; c) economical combustion mode at most continuous working loads.

Experiments with gasoline and diesel engine show that with conditioned fuel the fuel efficiency is 15-19% and engine power rises up to 9%. At peak loads engine reaches max torque at lower rpm (in 2.5-3 times) and keeps increased torque ($\geqq 80\%$ of max torque) in all further power range. The engine is capable to increase power more rapidly. In case of gas-turbine engine at peak loads, supplying more conditioned fuel gives increased power, thrust.

Referring to the FIGURE the gas turbine engine according to the present invention comprises a turbine and a combustion chamber having plurality of nozzles divided into two sets for selectively injecting base liquid fuel or activated liquid fuel. The fuel supply portion of the gas turbine engine comprises a fuel tank, fuel filter 10 for filtering solid particles that may present in the liquid fuel, and two separate parallel fuel delivery lines that can be selectively switched over by corresponding valves 1 and 4 for the base liquid fuel, 2 and 3 for the activated liquid fuel. An integrated control system is provided to selectively switching over to corresponded fuel according to the current operating conditions of the engine: the base liquid fuel at idling, cold start and shut-down of the engine, and the activated liquid fuel at most continuous working loads to achieve maximum fuel efficiency. The base liquid fuel is supplied to diffusion combustion nozzles.

To activate the liquid base fuel is fed to an absorber where it is mixed with the mix of air and exhaust gasses. The mix of the gasses is prepared in a gas jet pump 15, a slide valve 8 is open and air is fed by air pump 14 to the nozzle of the jet pump 15, air ejected through the nozzle creates vacuum in the jet pump mixing chamber and exhaust gases sucked from an exhaust manifold 7 with valves 6 open. Being mixed at set ration the mixed gasses is fed to the absorber under pressure. The activated liquid fuel with dissolved gasses is pumped to the premixed nozzles of the combustion chamber by the high pressure pump 12. Being injected at the condition prevailing in the combustion chamber an intensive gas expansion out of the activated liquid fuel leads to the finest fuel atomization, continuous degassing prevents fuel microdroplets coalescence thus providing fuel burning with high flame propagation and at same time stable and controllable.

In another embodiment to further increase the efficiency of the gas-turbine engine an incombustible evaporative liquid, e.g., demineralized and filtered water, treated with atomizing gasses under high pressure, is introduced in small amounts in the combustion process of light petroleum fuel—kerosene, gasoline or diesel. When water with dissolved gasses, especially a mixture of $CO_2$ with air, is injected in the combustion chamber the dissolved gasses burst out of solution; as a result incombustible liquid quickly evaporate and transfer to a state of superheated steam increasing the pressure in the combustion chamber of the gas-turbine engine.

Experiments confirm estimated parameters of vaporization of finely divided droplets having very small size and high curved surface. According to the Kelvin equation the smaller droplet radius the higher vapor pressure over the droplet surface is: for droplets of super fine size of less than $5 \times 10^{-3}$ μm the vapor pressure over droplet surface rises in more than 10 times and at the same dramatically increase the surface of evaporation in more than 300 time. To study the evaporation dynamics of the liquid phase with dissolve gases the following experiments with gas-turbine engine and gasoline engine were carried out: a) a gas mixture (35% $CO_2$+65% Air) were dissolved in water at the gas pressure of 10 bar to form a solution; b) injection of the solution charge (5.5% of fuel charge for gas-turbine engine and 6.5% of fuel charge for gasoline engine) into the combustion chamber. In both cases the evaporation period for the solution charge was less than 0.001 s and the pressure in the combustion chamber increased in 17-22%. This allow to suggest that that the injected charge is dispersed to a "nano" level.

To realize this improvement valve (25) is open and a liquid from a incombustible evaporative liquid source is supplied to a evaporative incombustible liquid absorber (24) as well as a gas mixture from the ejector-mixer (15) to form a gas in water solution. A pump 23 pumps the gas in water solution according to operating load conditions to the nozzles 29 where it is injected in the combustion chamber thus increasing enthalpy of the combustion process and engine performance while preventing deterioration of the internal components of the engine due to momentary evaporation of the liquid phase.

Instead of ejector-mixer (15) compact compressors of less than 150 W can be used to supply gas/gases to the liquid fuel and incombustible evaporative liquid absorbers of the engine having power over 500 hp. Air compressor (26) is supplied air to prepare base fuel/air mixture and a valve 5 is used to purge supply lines and nozzles and drain remained liquid fuel and incombustible evaporative liquid from appropriate absorbers at engine shut-off.

This invention does not described well known practices, such as fuel and gases pressure control It is understandable that this invention may be realized in any other modifications and structural designs without departing from the spirit of the invention and within the scope and range of equivalent claims.

The invention claimed is:

1. A system for feeding a gas turbine engine, comprising:
    a. a base fuel delivery line in fluid communication with a fuel tank to supply fuel to a gas turbine combustor;
    b. a conditioned fuel solution delivery line in fluid communication with the fuel tank to supply a conditioned fuel solution to the gas turbine combustor;
    c. an ejector mixer in fluid communication with exhaust gases from the gas turbine combustor and gas from a gas supply pump;
    d. a fuel conditioner in fluid communication with the conditioned fuel solution delivery line and the ejector mixer to produce the conditioned fuel solution;
    e. control valves for selectively supplying the fuel to the base fuel delivery line and the conditioned fuel solution delivery line; and
    f. an incombustible evaporative liquid-gas solution delivery line in fluid communication with an incombustible liquid absorber to supply an incombustible evaporative liquid-gas solution to the gas turbine combustor.

2. The system for feeding the gas turbine engine according to claim 1, further comprising a control subsystem for controlling the fuel flows to the base fuel delivery line and the conditioned fuel solution delivery line according to the gas turbine engine work load and operation modes.

3. The system for feeding the gas turbine engine according to claim 1, further comprising an incombustible evaporative liquid source for supplying an incombustible evaporative liquid to the incombustible liquid absorber.

4. A method of supplying fuel to a gas turbine combustor comprising:
    delivering a first portion of a liquid fuel from a fuel tank to the gas turbine combustor via a base fuel delivery line;
    delivering a second portion of the liquid fuel from the fuel tank to a fuel conditioner, wherein the fuel conditioner is in fluid communication with an ejector mixer, and wherein the ejector mixer is in fluid communication with exhaust gases from the gas turbine combustor and gas from a gas supply pump to form a conditioned fuel solution;

supplying an incombustible evaporative liquid-gas solution to the gas turbine combustor through an incombustible evaporative liquid-gas solution delivery line in fluid communication with an incombustible liquid absorber; and selectively supplying the first portion of the liquid fuel and the conditioned fuel solution to the gas turbine combustor during different gas turbine engine operating modes.

5. The method of supplying fuel to the gas turbine combustor according to claim 4, wherein the gas turbine engine operating modes comprise cold start, idle, maximum load, work load and shut-down.

\* \* \* \* \*